US012502151B2

(12) United States Patent
Senegas et al.

(10) Patent No.: US 12,502,151 B2
(45) Date of Patent: Dec. 23, 2025

(54) PATIENT MONITORING DURING A SCAN

(71) Applicant: KONINKLIJKE PHILIPS N.V., Eindhoven (NL)

(72) Inventors: Julien Thomas Senegas, Hamburg (DE); Lena Christina Frerking, Hamburg (DE); Holger Schmitt, Luetjensee (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 18/836,947

(22) PCT Filed: Jun. 14, 2023

(86) PCT No.: PCT/EP2023/065873
§ 371 (c)(1),
(2) Date: Aug. 8, 2024

(87) PCT Pub. No.: WO2023/247274
PCT Pub. Date: Dec. 28, 2023

(65) Prior Publication Data
US 2025/0143658 A1    May 8, 2025

(30) Foreign Application Priority Data
Jun. 22, 2022    (EP) .................................... 22180296

(51) Int. Cl.
*A61B 6/00*    (2024.01)
*A61B 6/58*    (2024.01)

(52) U.S. Cl.
CPC .......... *A61B 6/5217* (2013.01); *A61B 6/5205* (2013.01); *A61B 6/585* (2013.01)

(58) Field of Classification Search
CPC .............. A61B 2034/105; A61B 6/032; A61B 2034/2055; A61B 6/5264;
(Continued)

(56) References Cited

U.S. PATENT DOCUMENTS 7,715,606 B2    5/2010 Jeung
8,731,268 B2    5/2014 Li
(Continued)

FOREIGN PATENT DOCUMENTS

CN    111160326 A    5/2020
CN    211534415 U    9/2020
(Continued)

OTHER PUBLICATIONS

PCT International Search Report, International application No. PCT/EP2023/065873, Aug. 8, 2023.

*Primary Examiner* — Courtney Joan Nelson
(74) *Attorney, Agent, or Firm* — Larry Liberchuk

(57) ABSTRACT

An imaging system is for capturing images of a patient during a medical scan. A set of one or more cameras captures images of the patient such that, after applying distortion and perspective correction steps, pixel rows correspond to locations along an axis parallel to the direction of patient support movement and pixel columns correspond to locations along an axis perpendicular to the patient support. Patient motion of interest can then be identified based on image movements in the pixel column direction between sequential captured images. A measure of patient motion can then be derived.

14 Claims, 4 Drawing Sheets

(58) Field of Classification Search
CPC .... A61B 2034/2057; A61B 2034/2065; A61B 6/5205; A61B 5/0062; A61B 5/721; A61B 5/7289; A61B 5/11; A61B 2017/00694; A61B 5/72; A61B 5/7207; A61B 6/527; A61B 5/0013; A61B 6/06; A61B 6/582; A61B 6/5217; A61B 6/585; G06T 5/00; G06T 2207/30004; G06T 7/30; G06T 7/73; G06T 7/0012; G06T 7/207; G06T 7/246; G06T 2207/10081; G06T 2207/10088; G06T 7/215; G06V 10/25

See application file for complete search history.

(56) References Cited

U.S. PATENT DOCUMENTS

| | | | |
|---|---|---|---|
| 9,082,182 B2* | 7/2015 | Sebok | G06T 11/005 |
| 9,194,929 B2* | 11/2015 | Siegert | G01R 33/5673 |
| 10,438,349 B2* | 10/2019 | Yu | A61N 5/1049 |
| 10,445,886 B2* | 10/2019 | Hsieh | A61B 5/1122 |
| 10,716,515 B2 | 7/2020 | Gustafsson | |
| 10,863,957 B2 | 12/2020 | Hannemann | |
| 11,344,218 B2 | 5/2022 | Senegas | |
| 12,014,491 B2 | 6/2024 | Kimmel | |
| 2010/0002071 A1 | 1/2010 | Ahiska | |
| 2012/0002780 A1 | 1/2012 | Forthmann | |
| 2016/0247293 A1 | 8/2016 | Beylin | |
| 2019/0321657 A1* | 10/2019 | Hale | A61N 5/1075 |
| 2020/0205748 A1* | 7/2020 | Pautsch | A61B 6/032 |
| 2020/0234434 A1 | 7/2020 | Yu | |
| 2020/0268339 A1* | 8/2020 | Hao | A61B 6/544 |
| 2023/0005154 A1 | 1/2023 | Garcia I Tormo | |

FOREIGN PATENT DOCUMENTS

| | | |
|---|---|---|
| EP | 3832602 A1 | 6/2021 |
| JP | 2004208954 A | 7/2004 |
| JP | 2007089674 A | 4/2007 |
| JP | 2016087194 A | 5/2016 |
| WO | WO2014116868 A1 | 7/2014 |
| WO | WO2021110613 A1 | 6/2021 |

* cited by examiner

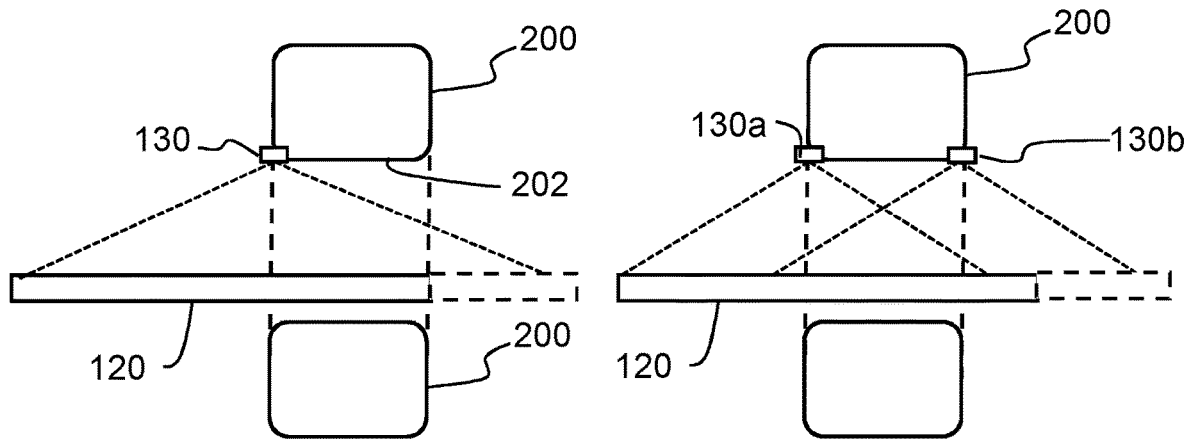
FIG. 3
FIG. 4
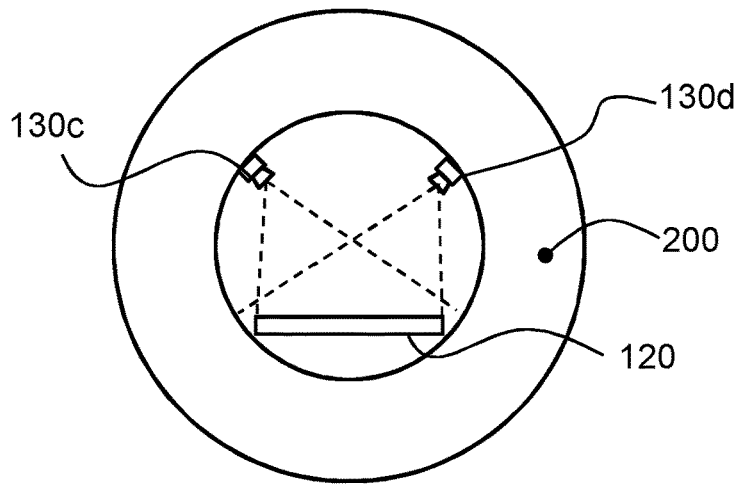
FIG. 5
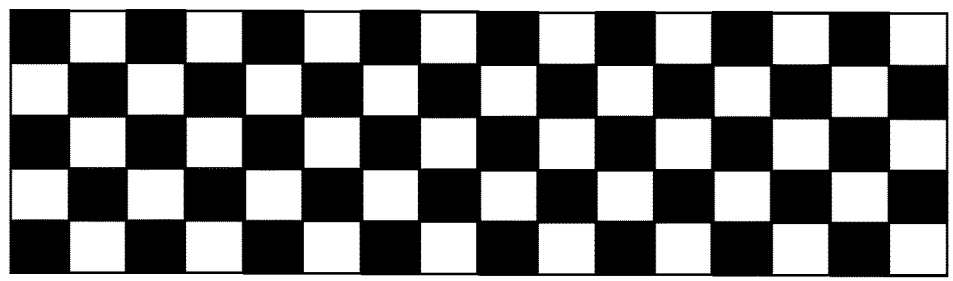
FIG. 6

PATIENT MONITORING DURING A SCAN

FIELD OF THE INVENTION

The invention relates to monitoring a patient during a medical scan, in particular to detect movement.

BACKGROUND OF THE INVENTION

In many medical imaging procedures it is important to monitor a patient during the imaging procedure, for instance, to monitor movement of the patient during the procedure or to monitor the well-being of the patient during the imaging procedure. For example monitoring images, such as video images provided by cameras, such as wide field of view cameras, are used for the monitoring.

By way of example, it is desirable to detect breathing-related movements in order to prevent and correct for motion artifacts, ensure optimal image quality, and support respiratory triggered scans. Indeed, undesired patient motion is one of the main reasons for image quality issues and safety events (like finger pinching).

Moreover, for these monitoring applications it is particularly important to monitor a predetermined region of interest of the patient. For instance, if breathing motions should be monitored, the chest of the patient has to be monitored, or, if a well-being of the patient should be monitored, the face of the patient has to be monitored. Since during certain medical imaging procedures, like CT imaging procedures or MR imaging procedures, the patient may be moved through the imaging device, for monitoring the region of interest of the patient this region of the patient has to be tracked in the provided monitoring images.

One of the problems in tracking a region of interest of a patient in a monitoring image, when the patient is moved through a medical imaging device during a medical scanning procedure, is that the shape and location of the region of interest will change in the monitoring image during the imaging procedure, due to the change of perspective of the monitoring camera with respect to the region of interest. This makes purely image based tracking of a region of interest to be monitored more difficult. Another problem in tracking a region of interest with a regular surveillance camera is the existence of occlusion, especially because the couch is moving through the bore. So, for example, it is very difficult to have a free, non-occluded view of the face of the patient throughout the exam, using regular surveillance cameras mounted on the scanning room walls.

Typically, two or more surveillance cameras are mounted in a scanning room to capture both front and rear views of the scanner. A camera is for example mounted at an angle such that there is at least a partial view through the scanning system e.g, through the bore of a CT scanner gantry.

In an approach where cameras are mounted on the room walls or ceiling, only a partial view at best to the patient can be provided during the scans. Most of the anatomy is likely to be occluded due to the shape of the patient himself/herself, the limited diameter of the bore through the scanning system, and the presence of positioning or medical devices.

The surveillance system thus cannot provide a continuous view to the relevant body parts of the patient throughout the whole examination, especially when the patient support travels through the scanning system.

Mounting the camera on the front or back end of the patient support would have the advantage to provide a stable view to the patient while the patient support is moving. However, this option is not desirable because these parts of the patient support are used to position medical devices or a head support. Moreover, in the case of heavy patients, the view to either the upper or lower part of the patient would be most likely obstructed by the abdomen.

There is therefore a need for an imaging system which is better able to capture images of the patient during a medical scan. These images may be subject to manual inspection to assess patient movement. However, in some cases, automated patient motion detection can be used as input for the image reconstruction algorithm and/or to drive the scanning process. It is also an important clinical input parameter for respiratory-gated and respiratory-triggered scans, like pulmonary scans and 4D CT scans that are used in CT simulations of radio-therapy.

One option is to place a camera on the scanning system, e.g, on the gantry facing the patient. The major challenge in that case is to separate apparent motion due to the horizontal displacement of the patient support, as happens during helical CT scans, from the true patient motion. Since the patient is lying, patient motion typically has a significant anterior-posterior motion component. However, due to the projective geometry of camera systems, these two motions overlap in the final camera images making extraction of the motion difficult.

Thus, there is also a need for a motion sensing solution that copes with the different patient orientations and patient support positions.

WO 2021/110613 discloses a system and method for monitoring a patient during a medical scan. It uses wide field of view camera to capture images of the patient. The position and shape of a region of interest is mapped while the patient support moves.

EP 3 832 602 discloses an apparatus for monitoring a subject during imaging. A region of interest is determined using two monitoring units at different support positions as well as a position map which is based on a calibration object at calibration support positions.

SUMMARY OF THE INVENTION

The invention is defined by the claims.

According to examples in accordance with an aspect of the invention, there is provided an imaging system for capturing images of a patient during a medical scan using a scanner having a scanning system and a patient support, the imaging system comprising:
- a set of one or more cameras for mounting in a fixed position relative to the scanning system directed towards the patient support for capturing images, wherein each camera of the set has an optical axis orthogonal to a direction of the patient support displacement in use of the scanner, and wherein pixel rows of images captured by each camera correspond to locations along an axis parallel to the direction of patient support movement;
- a processor, wherein the processor is configured to:
  perform image post-processing to correct distortions within the captured images resulting from the width of the field of view of the camera or cameras and to provide perspective correction;
  identify patient motion based on image movements in the pixel column direction between sequential captured images; and
  output a measure of patient motion.

This imaging system captures images in which patient support movement results in displacement in the pixel row direction. This is orthogonal to typical patient movement, which in the case of breathing is predominantly in the vertical direction. This motion is thus in the pixel column direction. This makes motion analysis simpler in that motion can be extracted simply from analysis of image changes in the pixel column direction, i.e., patient motion is identified based on image movements only in the pixel column direction between sequential captured images. The anterior-posterior component of the patient motion, which is the predominant component in patient motion for lying exams, can thus be optimally detected and quantified. The perspective correction accounts for the fact that the camera may not be exactly oriented orthogonally to the main axis of the gantry (which is also the direction of table motion), due to inaccuracies in positioning and orienting. After the perspective correction, the direction of table motion is exactly along the desired axis (lines) of the output image. By ensuring the correct orientation of the viewing angle of the output image, it is possible to quantify the detected motion in the pixel column (vertical) direction. If the viewing angle is not correctly aligned, the patient support movement would also result in small movements in the pixel column direction, which should be avoided.

The processor is for example configured to:
identify at least one region of interest within the images; and
identify patient motion for the at least one region of interest.

In this way, particular regions of the patient can be monitored for movement, for example regions which move with breathing.

The processor is for example further configured to track at least one region of interest of the patient during patient support displacement. Thus, the same regions can be monitored over time to detect local movement.

The processor may be configured to perform the tracking:
using an input which indicates the patient support motion; or
based on image-based feature identification and tracking.

Thus, the tracking may be based on image processing or it may use external patient support position information from the scanner.

The region or regions of interest for example comprise the abdomen. Thus a breathing motion signal may be derived from the image processing.

The region of interest can for example comprise the region including the scan plane area of the imaging system, i.e, the part of the imaging system where the data are acquired for image formation.

At least one camera of the set for example comprises a fisheye lens with a field of view greater than 150 degrees. Thus, the patient support (and the patient on the patient support) can be imaged by a small set of cameras, even with only a single camera.

The processor may be further configured to compute the depth of the moving parts with respect to the camera. Based on the depth, the motion can be quantified meaning that the physical amplitude and directions of the motion can be computed. The spatial coordinates of the points belonging to the moving parts can be computed. Additionally, based on the depth, a 3D model can be computed if needed.

In order to compute a depth map, principles known from stereovision are applied. The input is two images that were acquired with the table at two different positions. The corresponding table displacement (e.g, a number in mm) is obtained from the scanning system and is input. Since the perspective corrected images are such that the table displacement is along the lines of the image only, the correspondence between the two images is found by computing the horizontal shift between corresponding pixels. This is the disparity. The depth is computed from the disparity using the camera intrinsic parameters (e.g, focal length)

The processor is for example further configured to:
determine locations and amplitudes of local patient motion; and
derive an overall movement from the local patient motions.

The processor may be configured to perform a calibration process which involves imaging one or more calibration images. This calibration process enables the distortion and perspective correction to be implemented for the analysis of the movement of different patient areas at different positions within the field of view at different times.

The calibration is typically performed once after installation of the camera. It can be repeated whenever needed (for example after a service visit) but is not required every time when computing motion.

The invention also provides a medical scanner comprising:
a scanning system;
a patient support extending through the scanning system;
a drive system for driving the patient support through the scanning system; and
the imaging system defined above.

Each camera of the set is for example mounted to the scanning system with an orientation such that the optical axis is orthogonal to the direction of the patient support displacement in use of the medical scanner, and wherein pixel rows of images captured by each camera correspond to locations along an axis parallel to the direction of patient support movement.

This provides the desired pixel row alignment with the scanner patient support movement axis, such that pixel columns contain the relevant patient movement information.

The invention also provides an imaging processing method for processing images of a patient during a medical scan using a scanner having a scanning system, a patient support and a set of one or more cameras mounted in a fixed position relative to the scanning system directed towards the patient support, wherein each camera of the set has an optical axis orthogonal to a direction of the patient support displacement in use of the scanner, the method comprising:
receiving images from the camera or cameras of the set, wherein pixel rows of the images correspond to locations along an axis parallel to the direction of patient support movement;
performing image post-processing to correct distortions within the captured images resulting from the width of the field of view of the camera or cameras and to provide perspective correction;
identifying patient motion based on image movements in the pixel column direction between sequential captured images; and
outputting a measure of patient motion.

The method may comprise:
identifying at least one region of interest within the images; and
identifying patient motion for the at least one region of interest.

The region of interest for example includes the thorax.

The method may also comprise performing a calibration process by imaging one or more calibration image or images.

Shifts in the horizontal direction are for example also computed to obtain depth information and quantify the motion (amplitude, orientation, and spatial coordinates).

The invention also provides a computer program comprising computer program code which is adapted, when the program is run on the processor of the imaging system defined above, to implement the method above.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which:

FIG. 3 shows a side view of a CT scanner with a single camera located at one side of a gantry;

FIG. 4 shows a side view of a CT scanner with two cameras; a first camera located at one side of the gantry and a second camera located at an opposite side of the gantry;

FIG. 5 shows two cameras located within the gantry bore with lateral positions;

FIG. 6 shows a pattern for use in a calibration stage;

DETAILED DESCRIPTION OF THE EMBODIMENTS

Figure 1:
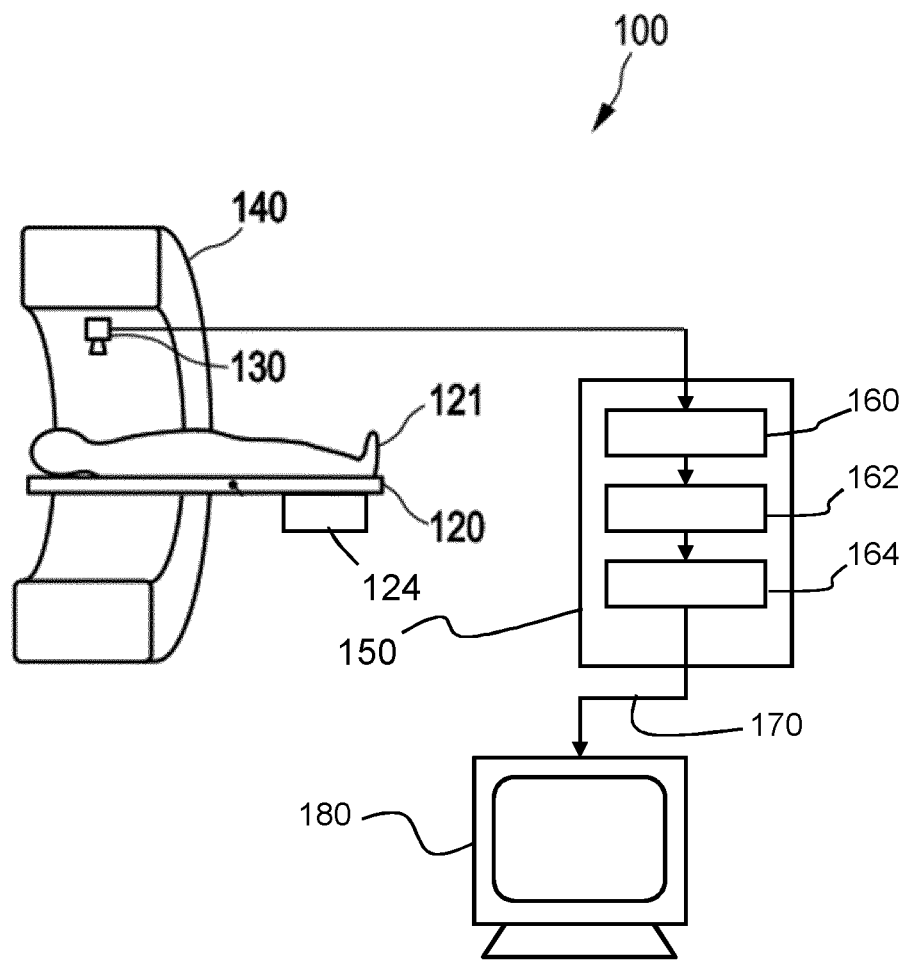
FIG. 1 shows schematically an example of a medical scanner.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides an imaging system for capturing optical images of a patient during a medical scan. A set of one or more cameras captures images of the patient such that, after applying distortion and perspective correction steps, pixel rows correspond to locations along an axis parallel to the direction of patient support movement and pixel columns correspond to locations along an axis perpendicular to the direction of patient support movement. Patient motion of interest can then be identified based on image movements in the pixel column direction between sequential captured images. A measure of patient motion can then be derived.

The invention relates generally to analysis of the movement of a patient. Two aspects are described below relating to movement analysis. The first aspect relates to the generation of a set of images which most easily allow movements to be visually inspected. The second aspect relates to automatically deriving a measure of the amount of movement of the patient, and this may for example be used for triggering the imaging process.

The two aspects may be implemented individually or combined. Although both aspects are described below, this invention relates in particular to the second aspect.

FIG. 1 shows schematically an example of a medical scanner 100 for acquiring a medical image of a subject and which additionally includes an imaging system for capturing optical images of the patient during the medical scan. The images are generated for the purposes of determining patient movement.

The medical scanner 100 comprises a scanning system such as a CT imaging system 140 that is adapted to acquire a medical image, i.e, a CT image in this example, of a patient 121 positioned on a patient support 120. The patient support 120 is adapted to move the patient 121 through the CT imaging system 140 during the CT imaging procedure. For this purpose, the medical scanner has a drive system 124 for driving the patient support through the scanning system.

The imaging system comprises an optical camera 130 that is adapted to acquire monitoring images of the patient 121 during the CT imaging procedure, and a processor 150. The operation of the system with a single camera will be explained, but there may be multiple cameras as explained further below. The camera can be a color or monochrome camera. It can use visible light or infrared light.

The camera 130 has a wide field of view so that it captures a full view of the patient support 120, or at least the part of the patient support 120 over which regions of interest of the patient will be positioned. Furthermore, the movement of the patient support 120 means that an even wider field of view is needed in order for the desired parts of the patient support to remain in the field of view of the camera (which is mounted statically to the scanning system) throughout the medical scan.

The camera for example comprises a fisheye lens with a field of view greater than 150 degrees, for example 160 degrees or more. Thus, the patient support (and the patient on the patient support) can be imaged either by a single camera as shown or by a small set of cameras.

The wide angle lens results in image distortion, such that the shape of objects appears differently at different regions of the field of view of the camera. As a result, the shape of objects or regions of interest will change when the position of those objects or regions of interest change in the field of view of the camera, as a result of the movement of the patient support.

To address this issue, the processor 150 performs image post-processing to correct those distortions within the captured images, i.e, resulting from the width of the field of view of the camera. This is shown as post-processing unit 160. For the purposes of the post-processing, the cameras are calibrated, such that geometric distortions are corrected by the post-processing, and the position and orientation of each camera with respect to the scanner coordinate system is known.

In accordance with the first aspect, the processor tracks at least one region of interest of the patient during the patient support displacement. This is implemented by tracking unit 162. The (or each) region of interest is a body part to be monitored such as the face, an area to be scanned, an area of IV injection, or the hands. The location of the region of interest in an initial image can be defined manually or automatically by appropriate algorithms (e.g, using keypoint detection algorithms) which locate a selected anatomical feature of interest.

The processor then generates a distortion-corrected image sequence of the (or each) region of interest. This is implemented by an image sequence generator 164.

The movement of the patient support is used for the tracking and for generating the distortion-corrected image sequence. The motion of the patient support is for example provided by the scanning system. Alternatively, the tracking of the region of interest may be based on an automated, image-based detection and tracking algorithm.

The distortion-corrected image sequence is provided as output 170 for display on a display 180. This display 180 may be part of the medical scanner, or it may be a separate device such as a mobile device of a technician or it may be part of a remote operation center, to which the image data is transmitted by wired or wireless data transfer.

The output 170 comprises a continuous video stream. There may be a video stream of one or regions of interest.

Figure 2:
FIG. 2 shows an example of three images of a distortion-corrected image sequence.

FIG. 2 shows an example of three images of the distortion-corrected image sequence, in which the region of interest is the face of the patient. There may be separate image sequences for separate regions of interest.

As shown, the camera (or each camera) is oriented towards the patient support and covers a wide range of view. The position, orientation and intrinsic parameters of the cameras are obtained by a calibration step which is performed once at system installation. This calibration enables the required image post-processing to be derived, which in turn enables the region of interest to be tracked during patient support displacement.

The distortion-corrected image sequence is for example a zoomed-in crop of the overall distortion-corrected camera images and it offers a continuous view of the same anatomy.

As can be seen in FIG. 2, despite the movement of the patient support relative to the camera, the region of interest is located at a static location within the images of that are cropped out of the distortion-corrected image sequence. The region of interest moves within the distortion-corrected images as a result of table displacement. After tracking the region of interest, a cropped image around the region of interest is generated, such that the body parts within this region of interest appear to be static. Thus, the cropped distortion-corrected image sequence appears to have been obtained from a camera which has travelled along with the patient support during the scan. The perspective will however change, since the region of interest is viewed from a different direction as a result of the movement.

In a most basic version, a perspective change is tolerated because movement occurring within the region of interest will still be easily discernible.

More preferably, the perspective is corrected by adapting a tilting of the output image in three dimensions, such that it has a specified view angle of the scene. The perspective correction provides a fix for a single z-plane (where z is the depth from the camera point of view). Since the motion that is to be detected takes place within an area that is broader than this single plane, the overall perspective still changes. When correcting the perspective with respect to the central plane, the perspective changes around it are however reduced to a minimum, such that the actual movement can still be detected.

In this way, the display output provides a way to monitor accurately the position and activity of a patient during the medical scan, which has previously been difficult especially during scans where the patient support moves back and forth. The system ensures optimal image quality and safe exam conditions.

There are various options for camera placement. FIG. 3 shows a side view of a CT scanner with a single camera 130 located at one side of a gantry 200 having an opening 202 through which the patient support 120 extends.

The camera 130 has a field of view which is sufficiently wide in the length direction of the patent support to cover the whole length of the patient support, and the field of view is sufficiently wide in the width direction of the patient support to cover the whole width of the patient support. Furthermore, the field of view covers the whole patient support over its range of movement (thus the patient support 120 is represented in FIG. 3 by the full range of positions it may adopt).

The camera field of view may instead only cover regions of the patient support over which the regions of interest will be located, e.g, the face and abdomen, but again including all the positions of those regions of the patient support during displacement of the patient support.

FIG. 4 shows a side view of a medical scanner with two cameras; a first camera 130a located at one side of the gantry 200 and a second camera 130b located at an opposite side of the gantry, where the "sides" are at different positions along the patient support—i.e, one side faces the head end of the patient support and one side faces the foot end patient support.

There may also be multiple cameras even at a same position along the patient support. FIG. 5 shows two cameras 130c, 130d which may be located within the gantry bore, or located at one side of the gantry. They face the patient support but from a lateral side rather than from directly above. As explained further below, this ensures vertical motion is evident in the images. For example, the cameras may be oriented at 90 degrees relative to each other (in a plane perpendicular to the length axis of the patient support).

Thus, the camera or cameras face the patient laterally and from above.

As explained above, a calibration process is used to derive the post-processing requirements to correct for image distortion. One approach is to apply a known pattern to the patient support, such as the checkerboard pattern shown in FIG. 6. Image distortions, particularly prominent at the edges of the field of view, may be corrected be deriving a correction function which returns the captured images to the known "correct" image. By calibrating the cameras with this checkerboard pattern, and combining the calibration result with the respective position of the patient support offered by the scanning system, the region of interest for one or more body parts can be tracked over time even when the patient support is moving, as explained above.

The second aspect also uses the scanning system, calibration approach, and one or more cameras with a wide field of view as discussed above.

Figure 7:
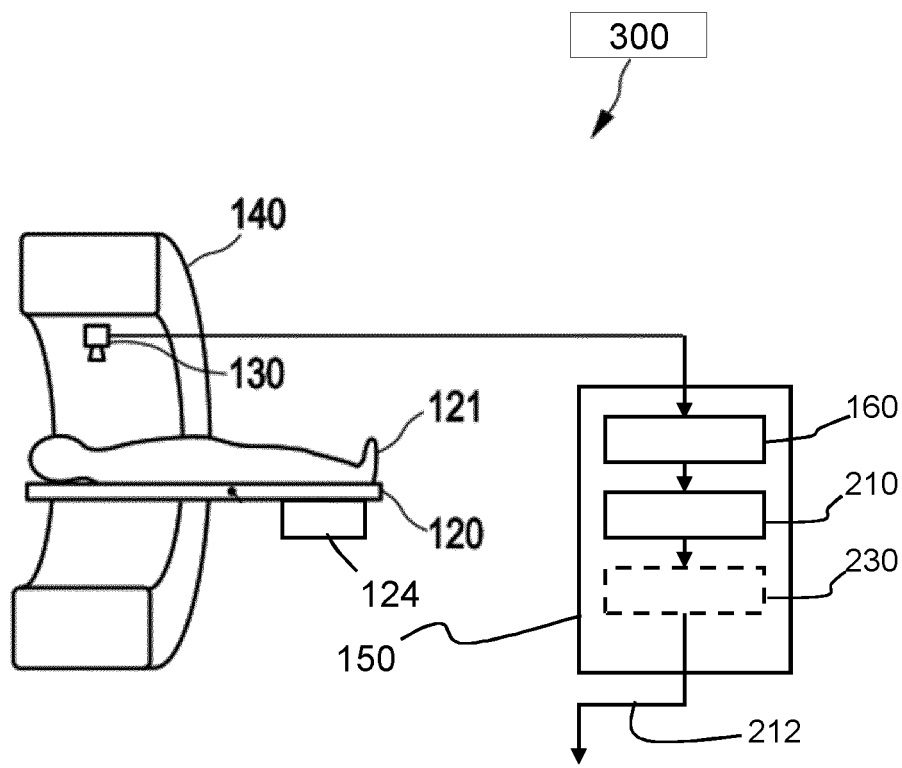
FIG. 7 shows a second example of a medical scanner.

FIG. 7 shows an example of medical scanner in accordance with the second aspect.

As in FIG. 1, the medical scanner 300 comprises a scanning system such as a CT system 140 that is adapted to acquire a CT image of a patient 121 positioned on a patient support 120. The patient support 120 is adapted to move the patient 121 through the CT imaging system 140 by drive system 124.

A wide field of view camera 130 is adapted to acquire monitoring images of the patient 121 during the CT imaging procedure, and a processor 150 processes the images.

The processor 150 performs image post-processing to correct distortions within the captured images resulting from the width of the field of view of the camera or cameras, as discussed above. This is again implemented by a post-processing unit 160, and the same calibration may be performed as explained above to enable the post-processing.

In this aspect, there is automatic identification of patient motion based on image movements, by motion detection unit 210.

A measure 212 of patient motion is output by the system.

This aspect relies on a particular configuration of the camera (or cameras) to simplify the automatic extraction of the motion signal.

Figure 8:
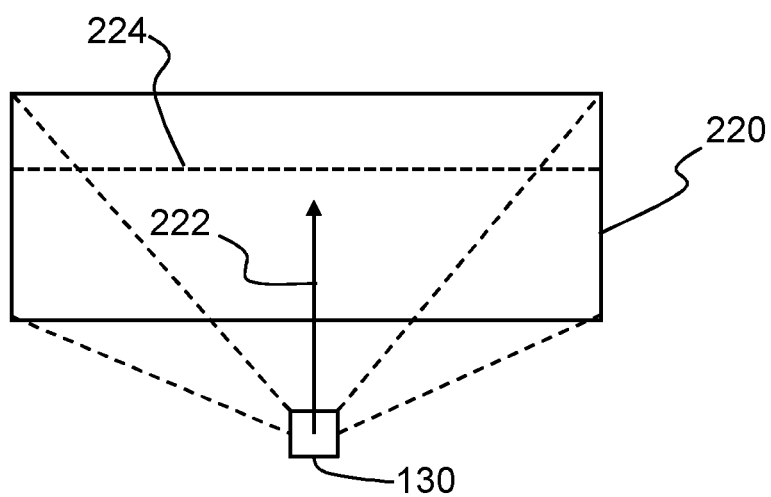
FIG. 8 shows a camera and its field of view to explain one design aspect of the scanner of FIG. 8.

FIG. 8 shows a camera 130 and its field of view 220. The camera has a central axis 222 which extends to a center of the field of view. This is the optical axis of the camera. This optical axis 222 is for example a vector which is normal to the plane of an array of image sensing elements and projects from a center of the array of imaging sensing elements.

The optical axis 222 is orthogonal to a direction of the patient support displacement in use of the scanner, e.g, the length direction of a patient support in the form of a couch. Furthermore, pixel rows of images captured by the camera correspond to locations along an axis parallel to the direction of patient support movement. A line 224 across the field of view maps to a pixel row in the generated image, and this line 224 within the field of view (e.g, when the camera is imaging the empty patient support) is parallel to the direction of patient support displacement, i.e, parallel to the length direction of the patient support.

This defines a particular orientation of the camera relative to the patient support. It means that in a captured image of an empty patient support, the pixel rows correspond to horizontal lines along the length of the patient support, whereas the pixel columns include a vertical component.

Thus, movement may be automatically measured by analyzing changes in location of the patient in the pixel column direction, as between sequential captured images.

For this purpose, the camera should not be directly overhead, since it will not then capture vertical displacements. The arrangement of FIG. 5 may for example be used, whereby two cameras capture partially lateral views of the patient, so that vertical patient movement will result in a component of movement in the pixel column direction of the captured images.

There may be one or more cameras at one side of the gantry only, or there may be one or more cameras at each side of the gantry, as explained above.

This imaging system thereby captures images in which patient support movement results in displacement in the pixel row direction whereas typical patient movement, such as breathing, is in an orthogonal direction, predominantly in the vertical direction.

In the same way as described above, the processor may additionally identify at least one region of interest within the images or divide the images into blocks, and then identify patient motion for the at least one region of interest or block. For each region of interest, the global horizontal pixel shift induced by the patient support motion between the successive frames is corrected for, by using the known patient support movement. The vertical motion component between the successive regions of interest is then computed as measure of patient motion. The images may be processed in real time or retrospectively to detect the patient motion between the consecutive frames.

FIG. 7 shows a module 230 for tracking the regions of interest.

Different algorithms can be applied for detecting the movement in the pixel column direction, such as optical flow algorithms or cross-correlation algorithms.

In this way, particular regions of the patient are automatically monitored for movement, for example regions which move with breathing. For breathing detection, the region or regions of interest for example comprise the abdomen. Thus, a breathing motion signal may be derived from the image processing. The processor may track at least one region of interest of the patient during patient support displacement.

As explained above, the tracking may use an input which indicates the patient support motion or it may be based on image-based feature identification and tracking.

Figure 9:
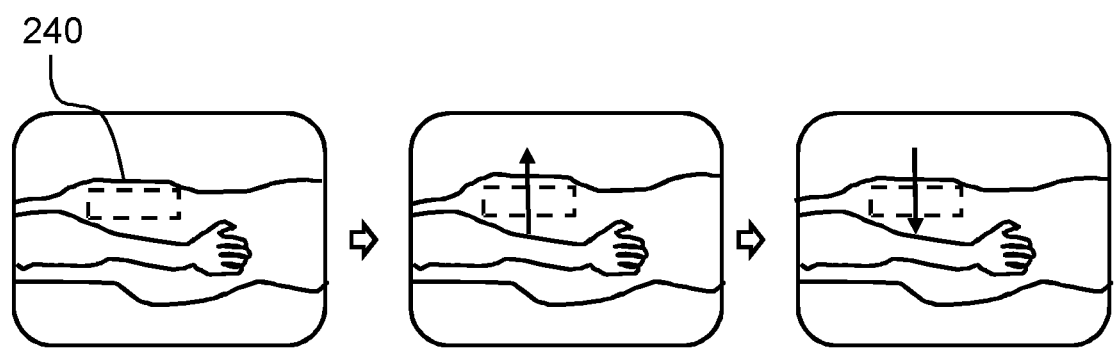
FIG. 9 shows a sequence of images of a patient, and shows a region of interest as a block at the abdomen area.

FIG. 9 shows a sequence of images of a patient, and shows a region of interest 240 as a block at the abdomen area. A motion signal is derived specifically for this region of interest, and it may be used for gating or triggering purposes, in known manner.

An optional additional image processing step may be applied, based on the known horizontal shift between consecutive frames during couch displacement. This step creates a mapping from the 2D images to 3D (world) coordinates. In particular, the sequence of images are from different viewpoints relative to the patient, so that over time even a single camera can perform as a multiple camera system. Thus, a 3D image can be generated based on stereo principles. In this way, the location and the amplitude of the moving subject parts can be computed.

The 3D modeling uses the known table movement as a prerequisite. The assumption is that there is no movement in the x-axis (pixel row) direction apart from the patient support motion. From the relation between the pixel shift for every single pixel, which is obtained from the motion detection algorithm, and the true motion (in mm) of the table, the relative size of the pixel in mm can be derived. Together with the focal length of the camera (which is known from the calibration step) this relative size can be translated into a value indicating the distance to the camera, which is equal to the depth. Since this calculation only uses the detected changes in pixel row direction, the movements in pixel column direction have no direct influence on the 3D modeling. Thus, the patient movement between different images does not prevent the generation of the 3D image.

As mentioned above, a calibration procedure is used. The output of the calibration process is a set of camera intrinsic parameters describing the optical properties of the sensor and length, such as focal length, optical center, and distortion coefficients. These parameters can then be used as input to compute the distortion free images. The calibration process also allows computing the exact position and orientation of the camera with respect to the scanner coordinate system, which is typically linked to the isocenter of the scanner. This step is referred to as computing the extrinsic parameters of the camera (pose matrix) and allows correcting for the perspective effect.

Based on the extrinsic parameters, the spatial coordinates of the moving parts can be expressed in scanner coordinate systems. Especially, this allows to detect whether the motion is taking place at or in the vicinity of the scan plane.

A simplified way to compute the physical amplitude of the motion is described here. For each pixel, the horizontal and vertical shifts between two images acquired at two consecutive time points are first computed using means know from state of the art, like optical flow or cross-correlation. The horizontal shift is due to the table displacement. The vertical shift is due to patient motion, if present. The amplitude in pixels of the horizontal shift depends on the depth of the corresponding part with respect to the camera: the closer the part is to the camera, the larger the pixel shift will be. In other words, together with the value of the table displacement between the two images, the amplitude of the horizontal shifts provides the physical optical resolution of the camera at this location. It can hence be used to compute the physical amplitude of the vertical shift. This last step is simply obtained by dividing the vertical pixel shift by the horizontal pixel shift, and multiplying this quotient by the table displacement in millimeters.

Based on the location and amplitude of the patient movement in the one or more regions of interest, an overall motion signal can be derived for the time of the scan, and significant patient motion can thus be detected. This computed motion signal can then be used to inform the operator about patient motion, either prior to or during the scan. It can be used to predict which slices of the imaged volume will be impacted by motion. It can also be used as input for the reconstruction of the data (e.g., gating or motion correction) and for 4D CT scans.

The invention may be applied to any medical scanner in which a patient support is moved during the imaging procedure, like a PET imaging device, an MR imaging device, a SPECT imaging device, as well as a CT scanner as described above. The medical scanner may comprise a C-arm or a closed bore. The camera or cameras may be located in the bore or at an inner surface of the C-arm, or outside the bore or C-arm envelope. However, in all cases, the camera is static relative to the main body of the scanning system and thus the patient support moves relative to the camera. The camera may not be mounted directly to the medical scanner but may instead be in a fixed position relative to the medical scanner by a separate mounting.

Although in the above described embodiments the patient support is always a patient support on which a patient is lying during the acquisition of the medical image, the patient support can also be configured for a sitting or a standing patient.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

Functions implemented by a processor may be implemented by a single processor or by multiple separate processing units which may together be considered to constitute a "processor". Such processing units may in some cases be remote from each other and communicate with each other in a wired or wireless manner.

The mere fact that certain measures are recited in mutually different dependent claims does not indicate that a combination of these measures cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunication systems.

If the term "adapted to" is used in the claims or description, it is noted the term "adapted to" is intended to be equivalent to the term "configured to". If the term "arrangement" is used in the claims or description, it is noted the term "arrangement" is intended to be equivalent to the term "system", and vice versa.

Any reference signs in the claims should not be construed as limiting the scope.

The invention claimed is:

1. An imaging system for capturing images of a patient during a medical scan using a scanner having a scanning system and a patient support, the imaging system comprising:
a set of one or more cameras for mounting in a fixed position relative to the scanning system directed towards the patient support for capturing images, wherein each camera of the set has an optical axis orthogonal to a direction of the patient support displacement in use of the scanner, and wherein pixel rows of images captured by each camera correspond to locations along an axis parallel to the direction of patient support movement;
a processor, wherein the processor is configured to:
perform image post-processing to correct distortions within the captured images resulting from a width of a field of view of the camera or cameras and to provide perspective correction;
identify patient motion based only on image movements in the pixel column direction between sequential captured images; and
output a measure of patient motion.

2. The imaging system of claim 1, wherein each camera of the set of cameras faces the patient support from laterally and above.

3. The imaging system of claim 1, wherein the processor is configured to:
identify at least one region of interest within the images;
identify patient motion for the at least one region of interest; and
track the at least one region of interest of the patient during patient support displacement.

4. The imaging system of claim 3, wherein the processor is configured to perform the tracking:
using an input which indicates the patient support motion; or
based on image-based feature identification and tracking.

5. The imaging system of claim 1, wherein the region or regions of interest comprise an abdomen.

6. The imaging system of claim 1, wherein at least one camera of the set comprises a fisheye lens with a field of view greater than 150 degrees.

7. The imaging system of claim 1, wherein the processor is further configured to compute a depth of moving parts with respect to the camera.

8. The imaging system of claim 1, wherein the processor is further configured to:
determine an amplitude of the patient motion in a specific location; and
derive an overall movement from the patient motion in the specific location.

9. The imaging system of claim 1, wherein the processor is configured to perform a calibration process which involves imaging one or more calibration images.

10. A medical scanner comprising:
a scanning system;
a patient support extending through the scanning system;
a drive system for driving the patient support through the scanning system; and
the imaging system of claim 1.

11. The medical scanner of claim 10, wherein each camera of the set is mounted to the scanning system with an orientation such that the optical axis is orthogonal to the direction of the patient support displacement in use of the medical scanner, and wherein pixel rows of images captured by each camera correspond to locations along an axis parallel to the direction of patient support movement.

12. An imaging processing method for processing images of a patient during a medical scan using a scanner having a scanning system, a patient support and a set of one or more cameras mounted in a fixed position relative to the scanning system directed towards the patient support, wherein each camera of the set has an optical axis orthogonal to a direction of the patient support displacement in use of the scanner, the method comprising:

receiving images from the camera or cameras of the set, wherein pixel rows of the images correspond to locations along an axis parallel to the direction of patient support movement;

performing image post-processing to correct distortions within the captured images resulting from a width of a field of view of the camera or cameras and to provide perspective correction;

identifying patient motion based on image movements only in the pixel column direction between sequential captured images; and outputting a measure of patient motion.

13. The method of claim 12, comprising:

identifying at least one region of interest within the images; and identifying patient motion for the at least one region of interest.

14. The method of claim 12, comprising performing a calibration process by imaging a calibration image.

* * * * *